United States Patent [19]
Elmore et al.

[11] 3,756,763
[45] Sept. 4, 1973

[54] PULSED HIGH PRESSURE LIQUID PROPELLANT COMBUSTION POWERED GAS GENERATORS

[75] Inventors: Lester C. Elmore, Portola Valley; Thomas M. Broxholn, Palo Alto, both of Calif.

[73] Assignee: Pulsepower Systems Incorporated, San Carlos, Calif.

[22] Filed: July 2, 1971

[21] Appl. No.: 160,578

Related U.S. Application Data

[62] Division of Ser. No. 869,660, Oct. 27, 1969, Pat. No. 3,620,313.

[52] U.S. Cl. .................................................. 431/1
[51] Int. Cl. .......................................... F23r 1/102
[58] Field of Search ..................... 60/26.11, 39.76; 431/1

[56] References Cited
UNITED STATES PATENTS
3,600,116  8/1971  Clark et al. ............................ 431/1
1,137,328  4/1915  Jennings ............................ 431/1 X FOREIGN PATENTS OR APPLICATIONS
424,955  12/1933  Great Britain ........................ 431/1

*Primary Examiner*—William F. O'Dea
*Assistant Examiner*—William C. Anderson
*Attorney*—Fryer, Tjensvold, Feix, Phillips & Lempio

[57] ABSTRACT

A liquid propellant is burned in the bulk mode and in pulses to produce high combustion pressures with large power outputs. The pulsed high pressure liquid propellant combustion provides a method of generating high pressure exhaust gases from a compact device. The gases generated are used for powering tools and other mechanisms. The high combustion pressures produced by burning the liquid propellant in the bulk mode and in pulses are used to overcome high back pressures such as those existing in deep ocean depths.

5 Claims, 7 Drawing Figures

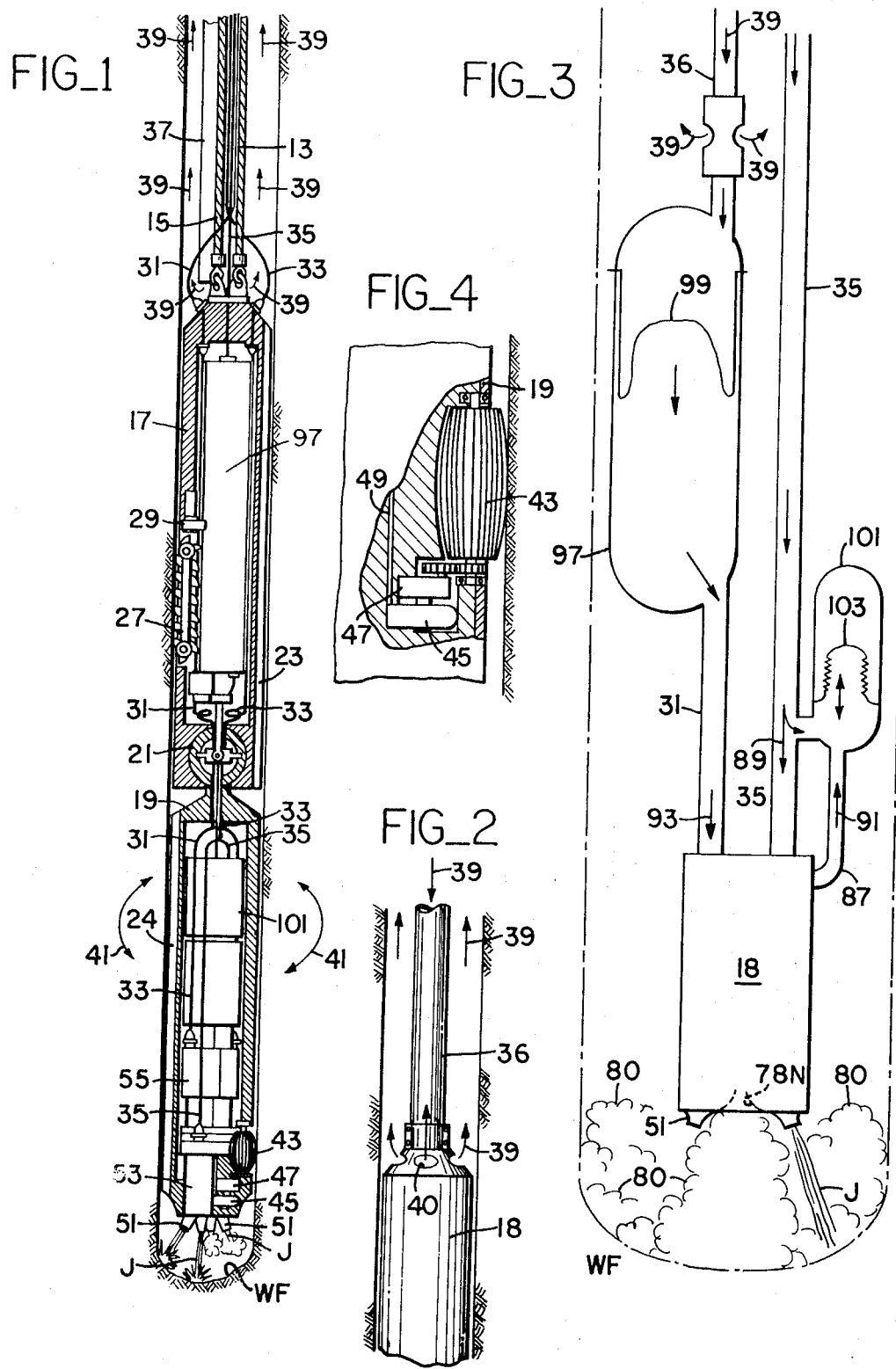

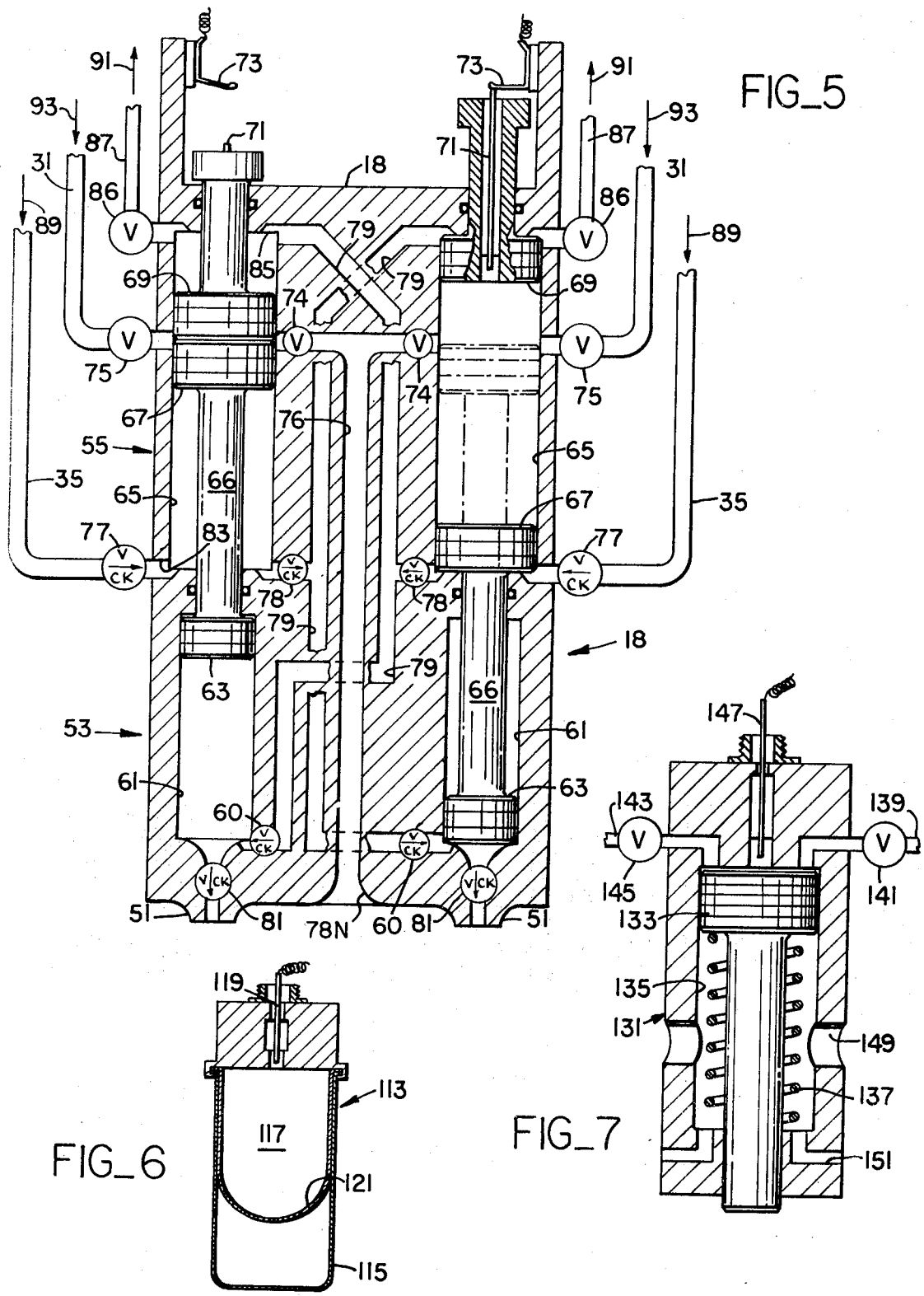

PULSED HIGH PRESSURE LIQUID PROPELLANT COMBUSTION POWERED GAS GENERATORS

This application is a division of our application Ser. No. 869,660 filed Oct. 27, 1969; and now issued as AS U.S. Pat. No. 3,620,313 on Nov. 16, 1971.

The present invention relates to pulsed combustion of a liquid propellant.

The present invention relates particularly to methods and apparatus for generating high pressure exhaust gases from a compact device for use in opposition to high ambient pressures, such as exist in deep ocean depths.

A liquid propellant is a liquid which can be changed in to a large volume of hot gases at a rate which is suitable for propelling projectiles or air vehicles.

A liquid propellant will ignite in the bulk mode. For example, the liquid propellant may be ignited by an electrical spark device immersed in the liquid propellant without the need to vaporize the propellant prior to the ignition.

Liquid propellants are high energy density liquids.

A liquid propellant can be burned in discrete pulses to produce high combustion pressures. Pulsed burning of a liquid propellant can produce combustion pressures in the range of 10,000 to 80,000 pounds per square inch and even higher. The magnitude of the average combustion pressure in such pulsed burning can be controlled by the amount of the expansion permitted. Higher average combustion pressures can be produced by permitting less expansion.

Burning a liquid propellant in discrete pulses produces other results not obtainable by other means.

High pressure combustion permits high pressure exhaust, a fundamental requirement in operations characterized by high back pressure, such as deep ocean or deep oil well drilling operations.

Pulsed combustion of a bulk loaded liquid propellant permits ready metering of the charge and regulation of the output.

The pulsed combustion minimizes pumping losses, which can be prohibitive in continuous combustion at high pressure.

The high energy density of the liquid propellant and the high pressure operation which can be produced by pulsed combustion results in very high horsepower outputs even under conditions of high back pressure operation. As a result, the pulsed combustion of a liquid propellant can be used to power high energy density machines which are small and lightweight.

It is a primary object of the present invention to combine the technology of pulsed high pressure liquid propellant combustion, as described, with the technology of liquid jet erosion drilling in a way that will make the maximum use of the benefits of both technologies.

In liquid jet erosion drilling pulsed jets of liquid, usually water, are directed against the workface to be drilled under very high pressure and at very high velocities. The high velocity, high pressure liquid jet has been found effective to transfer drilling energy from the drill to the workface at very high rates and at high efficiencies as compared to other methods of drilling.

Pulsed operation of the liquid jets has an additional advantage in that it permits more efficient break-up of the workface than continuous application of a liquid jet.

In accordance with the present invention a drillhead has an internal combustion chamber which includes a piston mechanically linked to another piston of a liquid jet motor also contained within the drillhead. A liquid propellant is fed into the combustion chamber in individual charges and is burned in the combustion chamber in discrete pulses. Individual charges of a liquid are concurrently fed into the liquid jet motor chamber and these charges are ejected through a nozzle associated with the motor chamber in pulses coincident with the burnings of the liquid propellant charges in the combustion chamber. The high horsepowers produced at the high combustion pressures during the pulsed combustion of the liquid propellant ejects the liquid through the nozzle in pulsed jets at high speed and high pressure. The high energy density power source permitted by the pulsed combustion of the liquid propellant permits the power source for the liquid jet erosion drill to be located right in the drillhead. The pulsed combustion mode of operation also permits all of the working structure to be compactly arranged in the drillhead. A liquid jet drillhead constructed to incorporate the features described and effective to function in the manner described constitutes a specific object of the present invention.

It is another object of the present invention to use pulsed combustion of a liquid propellant as the power source for producing a sound wave in seismic exploration.

The generation of sound at the proper intensity and frequencies has been a problem in seismic exploration. The generation of sound at the proper intensity and frequencies is particularly a problem in underwater exploration.

Initially, explosive charges ranging in size from a few pounds to as much as 50 pounds were detonated to provide the required energy. The use of such explosives was expensive, hazardous, slow, and complicated the operation of survey craft. Because of these limitations, other non-explosive sound sources have been investigated and developed. These include underwater spark, gas exploders, implosion devices and high pressure compressed air. Compressed air is often preferred because of performance, logistic and cost considerations. However, the application of an air operated sound source is restricted by water depth. Air operated sound sources cannot be used at great depths because of high back pressure limitations.

In accordance with the present invention a liquid propellant is burned in a discrete pulse, and the high pressure resulting from the pulsed combustion is used to generate a sound wave in the media surrounding the container in which the liquid propellant is burned. The rate at which the liquid propellant burns can be regulated to produce a highly efficient bubble pulse and to avoid an undesirable shock wave. The high combustion pressure which can be produced by pulsed burning of a liquid propellant permits a compact seismic source unit to be operated, either in a single shot mode or in a repetitive mode, at all ocean depths including the deepest ocean depths. This seismic source unit can be made light in weight (i.e. no air compressors or capacity storage banks) and can be therefore readily air transportable.

The present invention provides a method of generating high pressure exhaust gases from a compact device.

Other and further objects of the present invention will be apparent from the following description and claims and are illustrated in the accompanying drawings, which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the DRAWINGS:

FIG. 1 is an elevation view, partly in cross-section, of a drill constructed in accordance with one embodiment of the present invention;

FIG. 2 is a fragmentary view showing how a rigid drill pipe suspension can be used in place of the flexible cable suspension of FIG. 1;

FIG. 3 is a diagrammatic elevation view of a drill constructed in accordance with another embodiment of the present invention and illustrates how a propellant supply tank can be pressurized by the pressure head of the mud supply;

FIG. 4 is a fragmentary enlarged view in elevation illustrating structure for rotating the drillhead of FIG. 1;

FIG. 5 is an elevation view in cross-section of the drillhead of FIG. 3;

FIG. 6 is an elevation view in cross-section of a one shot seismic source constructed in accordance with an embodiment of the present invention; and FIG. 7 is an elevation view in cross-section of a repetitively fired seismic source constructed in accordance with another embodiment of the present invention.

A drill construction in accordance with one embodiment of the present invention is indicated generally by the reference numeral 11 in FIG. 1.

The drill 11 includes a drillhead which is suspended from flexible cables 13 and 15 in the embodiment shown in FIG. 1.

The drillhead is a two-part drillhead and includes an upper part 17 and a lower part 19. The upper and lower parts are connected through a gimbal mount 21 to permit articulation of the lower part with respect to the upper part. The articulated connection permits the lower part 19 to be swung at an angle to permit directional or even horizontal drilling.

The upper part 17 has flutes 23, and the lower part 19 has flutes 24 spaced circumferentially to permit upward movement of debris through the mud circulation system.

The upper part 17 includes a power driven track arrangement 27 which is engagable with the sidewall of the well to absorb the back thrust of the liquid jet erosion drills of the lower part 19 (as described in greater detail below). The track 27 is driven by a motor 29. The motor 29 may be powered by the burning of a liquid propellant through a line 31 or may be powered by electric motor or other suitable means.

In the embodiment of the invention as shown in FIG. 1 a second liquid propellant may be supplied through a line 33.

Water for the liquid jet (to be described in detail below) is supplied through a line 35, and the mud for the mud circulation system is supplied through a line 37. The water can also be supplied from a storage tank located in or close to the drillhead rather than being supplied from the surface as shown in FIG. 1.

In the embodiment of the invention shown in FIG. 1, the outlet of the mud supply line 37 is disposed just slightly above the upper end of the upper part 17 of the drillhead and the mud circulation is along the lines and in the direction indicated by the arrows 39. As will be described in greater detail below, the exhaust gases from the combustion of the liquid propellants supplied through the lines 31 and 33 is utilized to carry the debris up the flutes 24 and 23 and into the stream of circulating mud indicated by the arrows 39.

The lower part 19 is mounted for oscillation through 360° (as indicated by the arrows 41 in FIG. 1) about the longitudinal axis of the part 19, and a wall gripper and drive arrangement for accomplishing such oscillation is shown in detail in FIG. 4. The wall gripper includes a power driven knurled roller 43. The knurled roller 43 is rotated by a motor 45 through gearing 47. The motor 45 may be turbine driven through the gas produced by combustion of a propellant and supplied to the turbine through passageway 49, or the motor 45 may be an electrical motor or other suitable drive means. The motor 45 is rotatable in opposite directions to provide continuous oscillation back and forth of the lower part 19 of the drillhead during the time that the liquid jet erosion drill is in operation.

In accordance with the present invention, the lower part 19 of the drillhead includes a plurality of liquid jet nozzles 51. The nozzles 51 direct a very high velocity and very high pressure jet of liquid (in this case water) against the workface WF at the bottom of the hole. The jets J are directed against the workface in discrete pulses from each individual nozzle, and the oscillation of the drillhead 19 back and forth in the directions indicated by the arrows 41 produces substantially even drilling across the workface WF.

The liquid jets are ejected from the nozzles 51 by a plurality of fluid motors 53. The structure and mode of operation of a fluid motor 53 will be described in greater detail below with specific reference to FIGS. 3 and 5, but at this point it may be noted that the fluid motors are in the form of a cylinder and piston arrangement so that a fluid motor, in association with a nozzle 51, forms what is known as a water cannon for producing the extremely high speed and high pressure pulsed liquid jet J.

The lower part 19 of the drillhead also includes a plurality of motors 55. The motors 55 each have a cylinder and piston arrangement providing a combustion chamber for pulsed combustion of a liquid propellant supplied through the line 31 (in a manner described in greater detail with reference to FIG. 5 below). A piston of a motor 55 is directly connected to a piston of a liquid jet motor 53 (as will also be described in greater detail below with reference to FIG. 5).

FIG. 2 shows another embodiment of the present invention in which a one-piece drillhead 18 is directly connected to a rigid drillpipe 36. In this embodiment of the invention the mud circulating flow is in the direction and along the lines indicated by the arrows 39, passing through a series of openings 40 formed in the upper part of the drillhead 18.

FIG. 5 illustrates how compactly the water cannons 53 and pulsed liquid propellant power driven motors 55 can be arranged in the drillhead 18 of the FIG. 2 drill or in the drillhead 19 of the FIG. 1 drill.

As shown in FIG. 5 each water cannon 53 comprises a cylindrical bore 61, which forms a working chamber for the liquid ejected through the nozzle 51, and a piston 63.

Each of the pulsed liquid propellant powered motors 55 includes a cylindrical bore 65 and a piston 67.

The pistons 63 and 67 are interconnected by a piston rod 66.

A piston 69 is also mounted in each of the bores 65. The piston 69 forms part of an ignitor mechanism for the liquid propellant. The ignitor mechanism is an electrical ignitor in this case, but other specific forms of ignitors, as described below, may also be used. When the piston is moved to the position shown at the upper righthand corner of FIG. 5, a center electrode 71 engages an outer electrode 73 to produce an electrical spark within the liquid propellant in the combustion chamber between the pistons 67 and 69.

Liquid propellant is conducted into the chamber 65 through a conduit line 31 and through an inlet valve 75.

An internal passageway 76, including an exhaust valve 74, connects the outlet of the combustion chambers of the power motors 55 with an exhaust nozzle 78N formed in the bottom of the head block 18. This exhaust nozzle directs high pressure exhaust gases against the workface WF to produce a gas pad (generally indicated by the reference numeral 80 in FIG. 3) which facilitates the liquid jet action by clearing debris and preventing the accumulation of a layer of liquid between the liquid jet nozzles 51 and the workface WF.

Liquid, usually water, is conducted to the chamber 61 through inlet conduit lines 35 and inlet valves 77 and 78. Passageways 79 formed internally in the head block 18 lead from the outlet of valve 78 to the bores, or working chambers, 61 of the water cannons 53.

Valves 81 are located in the throat of the nozzles 51 and are closed except during downward movement of the pistons 63.

A passageway 83 in the head block 18, and extending between the valves 77 and 78, includes openings as illustrated extending into the bore 65 on the underside of the pistons 67. This arrangement permits the incoming liqud used for the liquid jet to assist in cooling the power motor 55.

The upper portions of passageways 79 include openings 85 connecting the passageways with the upper ends of the bores 65 above the pistons 69.

Liquid return conduit lines 87 also open into the upper ends of the cylinders 65. Valves 86 are located in the conduit lines 87.

Valves 77, 78, 60 and 81 are one-way check valves as illustrated in FIG. 5. All of the other valves shown in FIG. 5 can be electrically actuated by conventional electrical solenoids (not shown), and the sequence of operation of these valves will be specifically described below in the desciption of operation.

The direction of incoming liquid is as indicated by the arrows 89, and the direction of outgoing liquid is as indicated by the arrows 91.

The direction of incoming liquid propellant is as indicated by the arrows 93.

It is a feature of the present invention that that pulsed operation of the power motors 55 minimizes, and in some cases entirely eliminates, the need for pumps to feed the propellant to the combustion chambers of the motors 55. The pulsed operation permits working with the pressure ambient to the drillhead 18, rather than against this ambient back pressure and combustion chamber pressure as would be required in the case of continuous combustion. This feature of the invention will be described in greater detail below.

Before going into a description of the operation of the drillhead shown in FIG. 5 and a description of the manner in which this feature of the invention is obtained, a quick reference to FIG. 3 should be made. As illustrated in FIG. 3 a liquid propellant storage tank 97 may be located close to the drillhead 18.

The back pressure at the drillhead can become quite large as the drilling depth increases. A rough indication of the back pressure can be obtained by dividing the depth in feet in half and expressing the resulting figure as pressure in pounds per square inch. Thus, drilling at an extreme depth such as 50,000 foot would produce ambient pressures around the drillhead 18 in the order of magnitude of 25,000 pounds per square inch. That is, the column height of the circulating mud would produce back pressures in this order of magnitude (or greater depending on the specific gravity of the mud used) at this depth.

The storage tank 97 has a flexible diaphragm 99 separating the propellant in the bottom part of the tank from the mud above the diaphragm.

There is a difference in pressure head between supply and the liquid supplied through the line 35 when the liquid is water. This difference in pressure head is due to the difference in the specific gravity of the mud and water. The mud is heavier, providing a higher pressure and establishing the ambient pressure level.

As also illustrated in FIG. 3 a liquid supply surge tank 101 may also be located adjacent the drillhead 18 and connected to the excess liquid return line 87 as illustrated. The surge tank includes a flexible diaphragm or bladder 103 to separate a compressible gas in the upper part of the tank to thereby dampen surges from the excess water circulating through the line 87.

In the operation of the drillhead 18 shown in FIG. 5, the pressure of the incoming propellant admitted through the valve 75 forces the pistons 69 from the position shown on the lefthand side of FIG. 5 upwardly to fill the working chamber of the bore 65 above the piston 67 with liquid propellant. The valve 75 is closed, the electrode 71 comes in contact with the electrode 73, and the resulting electric spark ignites the liquid propellant in the bulk mode.

This ability to ignite the liquid propellant in the bulk mode (i.e. the ability to ignite a container of liquid as opposed to requiring some degree of prior vaporizing or breaking up of the fuel into separate streams prior to the ignition as would be required with other fuels or with some mode of operation other than pulsed firing) is a considerable advantage in this drilling application. It greatly simplifies the structure and operational techniques.

While electrical ignition is illustrated in FIG. 5, the liquid propellant can also be ignited by other means, such as chemical, pyrotechnic techniques or compression ignition means. In all cases the propellant can be ignited in the bulk mode.

One example of a suitable chemical ignitor is a liquid oxidizer injected into a monopropellant. Another example of a chemical ignitor is solid oxidizer pellets injected into the liquid propellant in the combustion chamber.

An example of a compression ignition means is ethylpropyl nitrate. This can be ignited in the vapor phase by compression to produce a flame which can be injected directly into the liquid propellant.

Continuing with the description of the operation of the structure shown in FIG. 5, the ignition of the liquid propellant produces high pressure combustion above the piston 67. This combustion pressure can range from 10,000 to 80,000 pounds per square inch and even higher. The combustion pressure can be regulated by varying the size of the charge of the liquid propellant admitted through the inlet valve 75. It is more efficient to expand out as far as possible. However if a higher exhaust pressure is needed, the liquid propellant can be burned at a higher pressure or the expansion ratio can be changed.

Combustion of the liquid propellant within the enclosed space between the pistons 69, 67 and inlet valve 75 and outlet valve 74 produces a sharp pulse of power driving the piston 67 down to the position illustrated at the righthand side of FIG. 5.

This, in turn, forces the liquid out of the working chamber 61 through the valve 81 and out the nozzle 51 at very high speed and under very high pressure. At this time the one way check valves 60 are closed. Liquid jet velocities of 5,000 to 10,000 feet per second in the jet J and liquid pressures of 100,000 pounds per square inch in the chamber 61 are readily produced by the water cannon or motor 53.

The piston 67 may preferably be made larger in area than the piston 63 so that the combustion chamber pressure is multiplied by the amount of the differential area to produce a higher static pressure in the working chamber 61 of the liquid jet motor 53.

The exhaust valve 74 is opened near the end of the downward stroke of the piston 67, and the exhaust gases then flow out of the nozzle 78N to produce the high pressure gas pad 80 described above and shown in FIG. 3. This exhaust pressure is higher than the pressure head of the circulating mud so that the exhaust gases clear the workface WF and carry debris upward to the circulating mud flow indicated by the arrows 39.

As the left hand piston 67 is driven to the downward position (illustrated at the right hand side of the FIG. 5), the water transfer valve 78 of the left hand motor is opened. The liquid in the bore 65 beneath the piston 67 flows through the check valve 78, the passageway 79 and the check valve 60 to the underside of the right hand piston 63 to return the right hand pistons 67 and 63 to the upper position (as shown in the phantom outline). As the right hand pistons 67 and 63 are moved upward by the liquid flowing into the bore 61 beneath the piston 63, the check valve 77 opens to permit flow of liquid into the bore 65 beneath the piston 67. The right hand piston 69 is also returned (to the downward position shown at the left hand side of FIG. 5) by the flow of liquid to the upper part of passageway 79 and the resulting liquid pressure exerted on the upper end of the piston 69. The valve 86 in the excess liquid return line 87 is opened near the end of the upward stroke of the piston 63 and the end of the downward stroke of the piston 69 to permit circulation of excess liquid back to the accumulator or surge tank 101 and to the incoming water supply line 35. The exhaust valve 74 is closed, and the right hand motors 53 and 55 are ready for another cycle of operation.

The pistons 67 shown at the right and lefthand sides of FIG. 5 are thus fired in pulses in alternation to produce corresponding pulsed liquid jets through the nozzles 51 and corresponding pulsed jets of gas out of the nozzle 78 between each pulsed liquid jet.

A liquid monopropellant may be used with the structure shown in FIG. 5 or a bi-propellant or a tripropellant may be used. The use of a monopropellant simplifies the conduits and valving required to transmit the incoming liquid propellant to the working chamber of the motor 55.

The propellant may be supplied from a storage tank located near the drillhead 18 as shown in FIG. 3, or the propellant may be supplied through propellant supply lines extending to the surface, such as the lines 31 and 33 shown in FIG. 1.

Examples of liquid propellants that are suitable for the drill described above are as follows:
1. Mixtures of hydrazine, hydrazine nitrate and water
2. Ethyl-propyl nitrite
3. Nitric acid in combination with jet fuel, diesel fuel or gasolene.

The pulsed operation permits the incoming liquid propellant to be delivered to the combustion chamber at a time when there is no combustion occurring in the combustion chamber. The incoming porpellant can therefore be supplied under much less pressure than would be the case if the propellant has to be pumped into the combustion chamber against a pressure head of a continuing combustion process. Since the combustion pressure must always be higher than the ambient pressure, the pulsed operation of the present invention has a very substantial benefit in eliminating the need for a pump to overcome the combustion chamber pressure, as would be required in a continuous combustion process.

FIGS. 6 and 7 show seismic sources constructed in accordance with additional embodiments of the present invention.

FIG. 6 is a single shot seismic source indicated generally by the reference numeral 113. The seismic source 113 includes a relatively thin walled container 115, a fixed quantity of liquid propellant 117 within the container, and an ignitor mechanism 119.

The ignitor mechanism 119 is shown as an electrical mechanism, but other suitable ignition means, including chemical, pyro-technic and compression ignition means can be used in place of the electrical ignitor.

Liquid propellant 117 is carried within the container 115 by an inner container 121 which provides some space for expansion within the outer container 15 after ignition of the liquid propellant and prior to bursting of the walls of the outer container 115.

Actuation of the ignitor 119 causes the liquid propellant 117 to burn in a sharp pulse.

Pulsed combustion of the liquid propellant produces a sound wave which can be effectively used in seismic exploration. The rise time of the sound wave can be adjusted to produce a relatively low frequency sound wave without the production of a shock wave inherent in an explosive. A rise time of 0.2 to 0.3 milliseconds can readily be obtained with a liquid propellant.

When used in underwater seismic exploration the seismic source 113 will produce a bubble pulse sound wave. Acoustic energy for the sound wave comes about because of a shrinking bubble without producing an initial and undesirable shock wave. The liquid propellant permits regulating the burning to produce only the bubble pulse.

The use of a liquid propellant provides a very substantial order of magnitude differential over explosives. Explosives are characterized by detonation and will produce wave front velocities in many thousands of feet per second in the explosive, e.g. about 22,000 feet per second for TNT. The wave front velocity for a liquid propellant is at the most a velocity in hundreds of feet per second in the propellant and, depending on the propellant used, may be less than 10 feet per second.

Liquid propellants suitable for use in the siesmic sound source illustrated in FIG. 6 can be the same as those listed above for the pulse motor for the drill.

FIG. 7 shows a repetitive firing seismic source constructed in accordance with another embodiment of the present invention. The seismic source shown in FIG. 7 is indicated generally by the reference numeral 131.

In this embodiment of the invention a piston 133 is mounted for reciprocation within a cylinder bore 135. The piston may preferably be spring biased by a spring 137 to the position shown in FIG. 7. Liquid propellant is conducted into the seismic source 131 through a inlet conduit 139 and an inlet valve 141.

Residual exhaust gases are conducted from the seismic source through an outlet line 143 and an exhaust valve 145.

An ignitor 147, in this case an electrical ignitor, ignites the liquid propellant in the bulk mode.

The resulting rapid downward movement of the piston 133 connects acoustic ports 149 to the high pressure gases in the combustion chamber above the piston. This in turn (by virtue of the principal acoustic radiation being the result of the bubble pulse) produces a relatively low frequency sound wave in the media surrounding the seismic source 131. Pressure equalizing ports 151 are provided in the lower end of the seismic source 131. These equalizing ports permit ambient pressure to be transmitted to the underside of the piston 133 at the end of the firing stroke so that the spring 137 can return the piston to the position illustrated in FIG. 7 after a firing stroke.

Liquid propellants which are suitable for producing the sound waves in the frequency desired with the apparatus shown in FIG. 7 can be the same as those listed above for the pulse motor for the drill.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of generating pressurized exhaust gas for use in opposition to high ambient back pressures and comprising, placing a gas generator mechanism having a combustion chamber in a high back pressure environment such as a deep ocean depth, bulk loading a quantity of a liquid propellant including a fuel and an oxidizer of the group comprising a liquid or a solid in a slurry form into said combustion chamber at a time when the outlet of the combustion chamber is closed, said liquid propellant being a high energy density liquid which burns to produce high combustion chamber pressures, said liquid propellant also being a liquid which can be ignited in the bulk mode without the need to vaporize the propellant prior to ignition, closing the inlet to said combustion chamber after the quantity of the liquid propellant has been loaded, then igniting the liquid propellant in the bulk mode without vaporizing the liquid propellant prior to ignition and generating pressurized combustion gas at pressures of at least 10,000 psi, expanding the combustion gas to produce an exhaust gas pressure lower than the combustion gas pressure but higher than the ambient pressure, opening the outlet of the combustion chamber and exhausting the exhaust gas from said combustion chamber, and deriving a work force from said exhausted gas.

2. A method as defined in claim 1 wherein the liquid propellant is a monopropellant.

3. A method as defined in claim 1 wherein the liquid propellant is a non-hypergolic bipropellant.

4. A method as defined in claim 1 including closing the outlet of the combustion chamber and reloading another quantity of the liquid propellant and repeating the steps listed in the sequence listed, whereby the quantities of liquid propellant are loaded into the combustion chamber after combustion and exhaust are completed and at a time when the pressure in the combustion chamber is a minimum, and whereby individual quantities of the liquid propellant are bulk burned in discrete pulses.

5. A method as defined in claim 4 including using ambient pressure to pressurize the liquid propellant loaded into the combustion chamber.

* * * * *